United States Patent [19]

Bertolacini et al.

[11] 3,943,050

[45] Mar. 9, 1976

[54] SERIAL REFORMING WITH ZIRCONIUM-PROMOTED CATALYSTS

[76] Inventors: Ralph J. Bertolacini, 859 W. Porter Ave., Chesterton, Ind. 46304; Dae K. Kim, 347 Custer Ave., Evanston, Ill. 60204

[22] Filed: July 26, 1973

[21] Appl. No.: 382,837

[52] U.S. Cl. .................. 208/65; 208/138; 208/139
[51] Int. Cl.² .................. C10G 35/08; C10G 39/00
[58] Field of Search ...... 208/138, 139, 65; 252/441, 252/442, 466 PT

[56] References Cited
UNITED STATES PATENTS

| | | | |
|---|---|---|---|
| 2,479,110 | 8/1949 | Haensel | 208/139 |
| 2,863,822 | 12/1958 | Sage | 208/65 |
| 2,914,465 | 11/1959 | Hengstebeck | 208/65 |
| 3,002,920 | 10/1961 | Porter et al. | 208/138 |
| 3,694,348 | 9/1972 | Bursian et al. | 208/138 |
| 3,770,616 | 11/1973 | Kominami et al. | 208/138 |

Primary Examiner—Delbert E. Gantz
Assistant Examiner—James W. Hellwege

[57] ABSTRACT

The catalyst comprises a Group-VIII-noble-metal hydrogenation component and a small amount of zirconium on a solid catalytic support comprising a porous refractory inorganic oxide. The zirconium may be present either in the elemental form or as compounds. The preferred hydrogenation component is platinum and the preferred porous refractory inorganic oxide is a catalytically active alumina.

The reforming process comprises contacting a petroleum hydrocarbon stream in a reforming zone under reforming conditions and in the presence of hydrogen with the above-described catalyst. In one embodiment, the process comprises contacting a partially-reformed hydrocarbon stream in a reforming zone under reforming conditions and in the presence of hydrogen with the above catalyst. In another embodiment, the process comprises contacting a naphtha in a reforming zone under reforming conditions and in the presence of hydrogen with the above catalyst. In a third embodiment, the process comprises contacting the petroleum hydrocarbon stream in a first reforming zone under reforming conditions and in the presence of hydrogen with a first reforming catalyst to produce a first reformate and subsequently contacting the first reformate in a second reforming zone under reforming conditions and in the presence of hydrogen with a second reforming catalyst, said second reforming catalyst being the catalyst described in the preceding paragraph.

6 Claims, 1 Drawing Figure

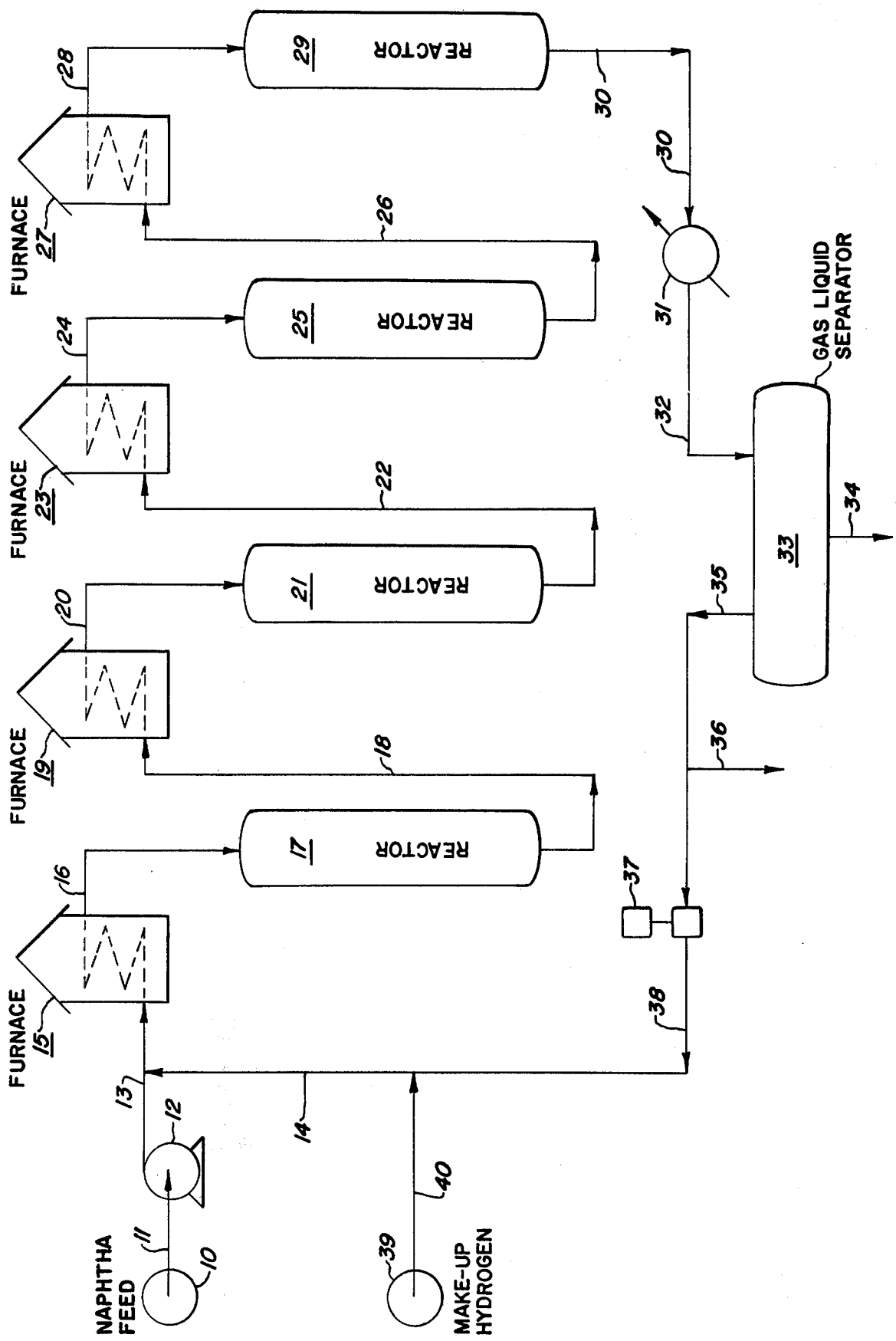

SERIAL REFORMING WITH ZIRCONIUM-PROMOTED CATALYSTS

BACKGROUND OF THE INVENTION

The reforming of petroleum hydrocarbon streams is one of the important petroleum refining processes that may be employed to provide high-octane-number hydrocarbon blending components for gasoline. In the typical reforming process, the reactions comprise dehydrogenation reactions, isomerization reactions, and hydrocracking reactions. The dehydrogenation reactions include the dehydrogenation of cyclohexanes to aromatics, the dehydroisomerization of alkylcyclopentanes to aromatics, the dehydrogenation of paraffins to olefins, and the dehydrocyclization of paraffins and olefins to aromatics. The isomerization reactions include isomerization of n-paraffins to isoparaffins, the hydroisomerization of olefins to isoparaffins, the isomerization of alkylcyclopentanes to cyclohexanes, and the isomerization of substituted aromatics. The hydrocracking reactions include hydrocracking of paraffins and hydrodesulfurization. Adequate discussion of the reactions occurring in a reforming reaction zone are presented in CATALYSIS, Vol. VI, P. H. Emmett, editor, Reinhold Publishing Corporation, 1958, pages 497 and 498, and PETROLEUM PROCESSING, R. J. Hengstebeck, McGraw-Hill Book Company, Inc., 1959, pages 179 through 194.

It is well known by those skilled in the art that several catalysts are capable of reforming petroleum naphthas and hydrocarbons that boil in the gasoline boiling range. Although reforming may be carried out through the use of molybdena-on-alumina catalysts, chromium-oxides-on-alumina catalysts, platinum-halogen-on-alumina catalysts, and platinum-aluminosilicate-material-alumina catalysts, the catalysts employing platinum as a hydrogenation component are generally employed today in the reforming processes of the petroleum industry.

It has now been found that a catalyst comprising a Group-VIII-noble-metal hydrogenation component and a small amount of zirconium on a solid catalytic support comprising a porous refractory inorganic oxide may be employed suitably to reform petroleum hydrocarbon streams. Embodiments of a reforming process employing this catalytic composition, i.e., the process of the present invention, provide high-octane-number blending material for unleaded and/or low-lead motor fuels.

SUMMARY OF THE INVENTION

Broadly, according to the present invention, there is provided a catalytic composition for reforming a petroleum hydrocarbon stream, which catalytic composition comprises a Group-VIII-noble-metal hydrogenation component and a small amount of zirconium on a solid catalytic support comprising a porous refractory inorganic oxide. The catalytic composition may contain a combined halogen, preferably, chlorine.

The preferred hydrogenation component is platinum. The preferred porous refractory inorganic oxide is a catalytically active alumina.

In one embodiment of the process of the present invention, there is provided a process for reforming a petroleum hydrocarbon stream. This embodiment comprises contacting the petroleum hydrocarbon stream in a reforming zone under reforming conditions and in the presence of hydrogen with the catalytic composition of the present invention. The petroleum hydrocarbon stream may be a naphtha, or it may be a partially-reformed hydrocarbon stream.

In another embodiment of the process of the present invention, there is provided a process for reforming a petroleum hydrocarbon stream, which process comprises contacting said hydrocarbon stream in a first reforming zone under reforming conditions and in the presence of hydrogen with a first reforming catalyst to produce a first reformate and subsequently contacting said first reformate in a second reforming zone under reforming conditions and in the presence of hydrogen with the catalytic composition of the present invention.

Accordingly, the process may employ the catalytic composition of the present invention either as the sole catalyst in the reforming process or as the final catalyst in a multiple-catalyst reforming system. The selection of the particular embodiment of the process of the present invention will be dictated by the feedstock to be reformed. If the hydrocarbon stream has already been partially reformed, the embodiment of the process employing the catalytic composition of the present invention as the sole catalyst is suitable.

BRIEF DESCRIPTION OF THE DRAWING

The accompanying FIGURE presents a simplified schematic flow diagram of a preferred embodiment of the process of the present invention, wherein the catalytic composition of the present invention is employed in the last reactor, or tail reactor, of a multiple-reactor reforming system.

DESCRIPTION AND PREFERRED EMBODIMENTS

The highly mechanized society of today requires an increasing demand for very-high-octane-number motor fuels. The process of this invention is especially advantageous for the production of high-octane-number blending components for motor fuels by means of the reforming of petroleum naphthas and petroleum hydrocarbon streams boiling in the gasoline boiling range. It may be employed suitably to produce high-octane-number blending components for unleaded and/or low-lead motor fuels.

The embodiments of the process of the present invention may be used to reform a feedstock which is a member selected from the group consisting of a virgin naphtha, a cracked naphtha, a hydrocarbon fraction boiling in the gasoline boiling range, and mixtures thereof. It may also be used to reform partially-reformed naphthas and other hydrocarbon streams. A naphtha will exhibit a boiling range of about 70° to about 500°F., preferably, about 180° to about 400°F. The gasoline boiling range comprises temperatures of about 120° to about 420°F., preferably, about 140° to about 380°F. The partially-reformed hydrocarbon streams will exhibit an unleaded research octane number within the range of about 75 to about 95. As used herein, the terms "mildly-reformed" and "partially-reformed" refer to such streams as have been reformed to an unleaded research octane number of about 75 to about 95.

Since many of the above feedstocks may contain appreciable amounts of nitrogen and sulfur compounds, which are deleterious to the first catalyst of that embodiment of the present invention which employs a multiple-catalyst reforming system, it is preferred that the feedstock in this case be subjected to a suitable hydrodesulfurization and/or hydrodenitrogenation treatment, such as hydrofining, prior to use in the embodiment of the process of the present invention. Such treatment will reduce both the nitrogen and sulfur levels to tolerable limits.

According to the process of the present invention, there is provided a process for reforming a petroleum hydrocarbon stream. One embodiment of this process comprises contacting said hydrocarbon stream in a reforming zone under reforming conditions and in the presence of hydrogen with the catalytic composition of the present invention. A second embodiment of the process of the present invention comprises contacting said hydrocarbon stream in a first reforming zone under reforming conditions and in the presence of hydrogen with a first reforming catalyst that does not contain zirconium to produce a first reformate and subsequently contacting said first reformate in a second reforming zone under reforming conditions and in the presence of hydrogen with a second reforming catalyst comprising a Group-VIII-noble-metal hydrogenation component and a small amount of zirconium on a solid catalytic support comprising a porous refractory inorganic oxide, i.e., the catalytic composition of the present invention. In another embodiment, the process comprises contacting a partially-reformed hydrocarbon stream in a reforming zone under reforming conditions and in the presence of hydrogen with a catalytic composition comprising a Group-VIII-noble-metal hydrogenation component and a small amount of zirconium on a solid catalytic support comprising a refractory inorganic oxide.

The first reforming catalyst, i.e., the catalyst that is employed in the first reforming zone of the multiple-reforming-zone embodiment of the process of the present invention, may be typically a reforming catalyst comprising a platinum group metal and combined halogen supported on a catalytically active alumina. It is contemplated that such catalyst may be promoted with a small amount of rhenium. It is to be understood that any suitable reforming catalyst in the art may be employed as the first catalyst in the first reforming zone, for example, a molybdena-on-alumina catalyst or a catalyst comprising a Group VIII noble metal and combined halogen on a refractory inorganic oxide. The Group VIII noble metals include ruthenium, rhodium, palladium, osmium, iridium, and platinum. A particular first catalyst is a catalyst consisting essentially of a Group VIII noble metal, rhenium, and combined halogen on a catalytically active alumina. A preferred first catalyst is a catalyst which comprises about 0.1 wt. % to about 2 wt. % platinum, about 0.05 wt. % to about 2 wt. % combined chlorine, and about 0.05 wt. % to about 2 wt. % rhenium on a catalytically active alumina. The catalytically active alumina that is employed as the support material for the first catalyst may be any catalytically active alumina, such as gamma-alumina or eta-alumina. Such alumina should have an average pore diameter of about 70 A to about 200 A, or larger. The alumina should have a surface area of at least 150 square meters per gram. Suitably, the surface area should be within the range of about 200 to about 800 square meters per gram, or larger.

The second reforming catalyst, i.e., the catalyst that is employed in the second reforming zone of this multiple-zoned embodiment of the process of the present invention, is the catalytic composition of the present invention. It comprises a Group-VIII-noble-metal hydrogenation component and a small amount of zirconium on a solid catalytic support comprising a porous refractory inorganic oxide.

Suitable hydrogenation components that are employed in a typical reforming catalyst include Group VIB metals of the Periodic Table of Elements, particularly, molybdenum and chromium, the oxides of Group VIB metals, and Group VIII metals, particularly, the Group VIII noble metals. As pointed out hereinabove, the Group VIII noble metals include ruthenium, rhodium, palladium, osmium, iridium, and platinum. The preferred Group VIII noble metal is platinum. For the purposes of this discussion, the Periodic Table of Elements appearing on page 628 of WEBSTER'S SEVENTH NEW COLLEGIATE DICTIONARY, G. & C. Merriam Company, Springfield, Mass., U.S.A., 1963, was employed.

The hydrogenation component for the catalyst of the present invention is a Group VIII noble metal and may be present in an amount of about 0.05 wt. % to about 2 wt. %, calculated as the element and based upon the total weight of the catalyst. Preferably, the Group VIII noble metal is present in an amount of about 0.1 wt. % to about 1 wt. %, calculated as the element and based upon the total weight of the catalyst.

Another essential component of the catalyst of the present invention is zirconium, a member of Group IVB of the Periodic Table of Elements. Zirconium may be present in an amount of about 0.05 wt. % to about 5 wt. %, calculated as the element and based upon the total weight of the catalytic composition. Preferably, zirconium is present in an amount of about 0.1 wt. % to about 1 wt. %. The zirconium that is present in the catalyst of the present invention is present as a promoter and is not a constituent of the catalyst support. The zirconium may be present either in the elemental form, or as one or more compounds, or as mixtures thereof.

Rhenium may also be a component of the catalyst of the present invention. It may be present in an amount of about 0.05 wt. % to about 3 wt. %, calculated as the element and based upon the total weight of said catalytic composition.

The solid catalytic support of the catalyst of the present invention comprises a porous refractory inorganic oxide, such as an alumina or a silica-alumina. The preferred refractory inorganic oxide is a catalytically active alumina, such as gamma-alumina, eta-alumina, or mixtures thereof. The properties of such alumina are presented hereinabove. The solid catalytic support may also contain a crystalline aluminosilicate material. Such crystalline aluminosilicate material is a large-pore aluminosilicate material and preferably possesses pores within the range of about 5 A to about 20 A. A preferred crystalline aluminosilicate material is mordenite or faujasite. Suitably, the crystalline aluminosilicate material is suspended in and distributed throughout a matrix of the porous refractory inorganic oxide. The aluminosilicate material may be present in an amount of about 0.5 wt. % to about 25 wt. %, based upon the weight of the catalytic support. Preferably, the large-pore crystalline aluminosilicate material has been cation-exchanged with a member selected from the group consisting of an alkaline earth metal, a rare earth metal, a polyvalent metal, hydrogen, and a hydrogen precursor, such as ammonium, to reduce the alkali-metal content of the aluminosilicate material to a level that is less than 1 wt. %, calculated as the metal.

The catalyst of the present invention may also contain a combined halogen. Suitable halogens are chlorine and fluorine. The preferred halogen is chlorine. The halogen may be present in an amount of about 0.1 wt. % to about 2 wt. %, based upon the total weight of the catalyst. Preferably, the halogen is present in an amount of about 0.1 wt. % to about 1 wt. %, based upon the weight of the catalyst.

It is contemplated that other metal components could be constituents of the catalytic composition of the present invention, so that various combinations of such metals and the Group VIII noble metal would be present; for example, platinum-rhenium, iridium-gold, and platinum-lead-cadmium. In each case, zirconium would be present in an amount suggested hereinabove. All Group VIII noble metals, except osmium, could be a component of such a combination.

The catalyst of the present invention may be prepared in various ways. For example, a soluble compound of the Group-VIII-noble-metal hydrogenation metal and/or soluble compounds of the other metals and zirconium may be added to a sol or gel of the refractory inorganic oxide. This composition may be thoroughly blended and the sol or gel mixture may be subsequently co-gelled by the addition of dilute ammonia. The resulting co-gelled material may then be dried and calcined. If an aluminosilicate material is to be a component of the catalytic composition, it may be added in a finely-divided form to the sol or gel of the refractory inorganic oxide and suitable compounds of the Group-VIII-noble-metal hydrogenation component and zirconium, and other metals, if any, may be added thereto, and the resulting composition may then be thoroughly blended prior to co-gelling, drying, and calcining. In another method of preparation, the refractory inorganic oxide is gelled, dried, pelleted, calcined, and cooled, and the resulting composition is then impregnated with one or more solutions of the Group-VIII-noble-metal hydrogenation component, zirconium, and any other metal.

Suitable calcination conditions comprise a temperature in the range of about 700°F. to about 1,100°F. and a calcination time of about 1 to about 20 hours. Suitable drying conditions comprise a temperature in the range of about 200°F. to about 400°F. and a drying time of about 3 to about 30 hours. Preferably, drying conditions comprise a temperature of about 250°F. for about 8 to about 16 hours and calcination conditions comprise a temperature of about 1,000°F. for about 2 to about 6 hours.

The zirconium may be added as any convenient soluble form, for example, as the oxychloride, nitrate, acetate, or any other compound which would not introduce into the composition an anion that is known to be detrimental to catalytic activity, such as sulfate. The halogen may be incorporated into the catalytic composition as a halide of the hydrogenation metal, or as a halogen acid, or a halide salt.

The catalyst of the present invention, that is, the catalyst comprising a Group-VIII-noble-metal hydrogenation component and a small amount of zirconium on a solid catalytic support comprising a porous refractory inorganic oxide, is suitable for the conversion of petroleum hydrocarbon streams and is useful for such hydrocarbon processes as disproportionation, isomerization of paraffins and aromatics, alkylation-dealkylation, hydrogenation-dehydrogenation, hydrocracking, and reforming. In particular, it is employed for the reforming of petroleum hydrocarbon naphthas and those petroleum hydrocarbon streams boiling in the gasoline boiling range. This catalyst is effective for converting the heavy paraffins remaining in a reformate. Therefore, a preferred embodiment of the process of the present invention is a process which employs a first reforming catalyst in a first reforming zone and the catalyst of the present invention as a second reforming catalyst in a second reforming zone. Still more particularly, the first reforming catalyst is employed in all of the reactors except the tail reactor and the second reforming catalyst is employed in the tail reactor. For selected conditions and selected feedstocks, it is contemplated that the first reforming zone could constitute two or more reactors and the second reforming zone could constitute at least one reactor. In an alternative embodiment of the process of the present invention, the reforming system could comprise one or more reactors containing the catalyst of the present invention as a catalyst and making up a sole reaction zone. To this latter embodiment, a partially-reformed naphtha would be the preferred feedstock.

Therefore, according to one embodiment of the process of the present invention, there is provided a process for reforming a petroleum hydrocarbon stream, which process comprises contacting a partially-reformed hydrocarbon stream in a reforming zone under reforming conditions and in the presence of hydrogen with a catalyst comprising a Group-VIII-noble-metal hydrogenation component and a small amount of zirconium on a solid catalytic support comprising a porous refractory inorganic oxide. In another embodiment of the process of the present invention, the process comprises contacting a petroleum hydrocarbon stream in a first reforming zone under reforming conditions and in the presence of hydrogen with a first reforming catalyst to produce a first reformate and subsequently contacting said first reformate in a second reforming zone under reforming conditions and in the presence of hydrogen with a second reforming catalyst comprising a Group-VIII-noble-metal hydrogenation component and a small amount of zirconium on a solid catalytic support comprising a porous refractory inorganic oxide. This latter embodiment is a process wherein the first reforming zone comprises two or more reactors and the second reforming zone comprises at least one reactor.

Typical operating conditions of the reforming process of the present invention comprise an average catalyst temperature of about 700°F. to about 1,050°F., a pressure of about 50 psig to about 1,000 psig, a weight hourly space velocity (WHSV) of about 0.5 to about 10 weight units of hydrocarbon per hour per weight unit of catalyst, and a hydrogen addition rate of about 1,500 standard cubic feet of hydrogen per barrel of hydrocarbon (SCFB) to about 15,000 SCFB. Preferred reforming conditions comprise an average temperature of about 850°F. to about 950°F., a pressure of about 50 psig to about 300 psig, a WHSV of about 1 to about 8 weight units of hydrocarbon per hour per weight unit of catalyst, and a hydrogen addition rate of about 3,000 SCFB to about 10,000 SCFB. These operating conditions are appropriate for each reforming zone of the multiple-zone embodiment of the process of the present invention and for each reactor of the system which employs only a single reforming zone.

The process of the present invention can be carried out in any of the conventional types of equipment known to the art. One may, for example, employ catalysts in the form of pills, pellets, granules, broken fragments, spheres, or various special shapes, disposed as one or more fixed beds within one or more reaction zones, and the charging stock may be passed therethrough in the liquid, vapor, or mixed phase, and in either upward or downward flow. Alternatively, the catalysts may be in a suitable form for use in moving beds, in which the hydrocarbon feedstock and catalyst are preferably passed in countercurrent flow; or in fluidized-solid processes, in which the feedstock is passed upward through a turbulent bed of finely divided catalyst; or in the suspensoid process, in which the catalyst is slurried in the hydrocarbon feedstock and the resulting mixture is conveyed into the reaction zone. A fixed-bed reforming process is exemplified by Ultraforming (*Petroleum Engineer*, Vol. XXVI, No. 4, April 1954, at page C-35). In a six-reactor unit with the five fixed-bed reactors on oil and one fixed-bed reactor under regeneration, when employing the multiple-zone embodiment, it is convenient to employ the second reforming catalyst in the last reactor and a mixture (or layers) of the first reforming catalyst and the second reforming catalyst in the swing reactor. The reaction products from any of the foregoing processes are removed from the reaction zones and fractionated to recover the various components thereof. The hydrogen and unconverted materials are recycled as desired, the excess hydrogen produced in the reformer conveniently being utilized in the hydrodesulfurization of the hydrocarbon feed.

Unwanted products in the reforming of petroleum hydrocarbon streams are light hydrocarbon gases and coke. Such products and other compounds, such as polynuclear aromatics and heavy hydrocarbons, may result in coke. As the operation progresses, a substantial amount of coke accumulates on the surface of each of the catalysts resulting in an increasingly rapid rate of catalyst deactivation. Consequently, the coke must be removed periodically from the surface. Such coke removal may be accomplished through a coke-burn treatment wherein the coked catalyst is contacted with an oxygen-containing gas at selected temperatures. Typically, the gas will contain oxygen within the range of about 0.2 volume percent to about 21 volume percent. The concentration of oxygen in the gas should be maintained at a level which will not result in the production of temperatures that will be in excess of 1,100°F., preferably, in excess of 1,050°F.

The process of the present invention may be employed typically as a semi-regenerative reforming process or as a regenerative or cyclic process.

In a semi-regenerative reforming system, the flow of hydrocarbons to all of the reactors is stopped and the catalyst in each of the reactors is regenerated. In a regenerative or cyclic reforming system, one of the reactors is removed from the system and is replaced by an auxiliary reactor. Reforming of petroleum hydrocarbons continues in such a system while catalyst in the reactor that has been removed from the system is regenerated. The auxiliary reactor is known as a swing reactor. It is contemplated in the process of the present invention that the multiple-reactor system may include either one swing reactor or two swing reactors. When two swing reactors are being employed, one will contain the catalyst that is employed in the first reforming zone of the process and will be used to replace a reactor in the first reforming zone. The other will contain the catalyst that is employed in the second reforming zone and will be used to replace a reactor in the second reforming zone.

Either the first reforming catalyst or the second reforming catalyst that is employed in the multiple-zone embodiment of the process of the present invention is capable of being regenerated and is capable of withstanding the conditions employed in the regeneration treatment.

A preferred embodiment of the process of the present invention is depicted in the accompanying FIGURE. This FIGURE is a simplified schematic flow diagram of a preferred embodiment. It does not include certain auxiliary equipment, such as heat exchangers, valves, pumps, compressors, and associated equipment, which would be needed in various places along the flow path of the process in addition to the pump and compressor that are depicted in the drawing. Such additional auxiliary equipment and its location requirements would be quickly recognized by one having ordinary skill in the art. Therefore, such equipment is not shown in the FIGURE.

In the embodiment represented in the FIGURE, a naphtha heart cut, having a boiling range of about 160°F. to about 400°F., preferably, about 180°F. to about 380°F., is obtained from source 10. This feedstock is passed through line 11 into pump 12, which pumps the hydrocarbons through line 13. Hydrogen-containing recycle gas is introduced into line 13 via line 14 to be mixed with the hydrocarbons in line 13. The resulting hydrogen-hydrocarbon mixture passes through line 13, furnace 15, and line 16 into the top of reactor 17. The material is introduced into reactor 17 at a temperature of about 940°F. to about 980°F. The outlet temperature of reactor 17 is approximately 800°F. and the pressure in reactor 17 is within the range of about 160 psig to about 320 psig.

The effluent from reactor 17 passes through line 18, furnace 19, and line 20 into the top of reactor 21. Sufficient heat is introduced into this hydrogen-hydrocarbon stream by furnace 19 so that the temperature at the inlet of reactor 21 is about 960°F. to about 1,000°F. The outlet temperature of reactor 21 is approximately 855°F. and the pressure in reactor 21 is within the range of about 140 psig to about 300 psig.

The effluent from reactor 21 passes through line 22, furnace 23, and line 24 into the top of reactor 25. This effluent is heated in furnace 23 so that the inlet temperature of reactor 25 is about 960°F. to about 1,000°F. The outlet temperature of reactor 25 is approximately 940°F. and the pressure in reactor 25 is within the range of about 120 psig to about 280 psig.

The effluent from reactor 25 passes through line 26, furnace 27, and line 28 into the top of reactor 29. This hydrocarbon effluent is heated in furnace 27 so that the inlet temperature of reactor 29 is about 980°F. to about 1,020°F. The outlet temperature of reactor 29 is about 950°F. and the pressure in reactor 29 is within the range of about 100 psig to about 260 psig.

Reactors 17, 21, and 25 all contain a catalyst comprising platinum and combined chlorine on a support of catalytically active alumina. The catalyst may be promoted by a small amount of rhenium. In general, the catalyst contains 0.1 to about 2 wt. % platinum and 0.1 to 2 wt. % combined chlorine, preferably, 0.1 to 1 wt. % chlorine. The fourth reactor, or tail reactor, in the system contains a second reforming catalyst comprising about b 0.05 wt. % to about 2 wt. % platinum, about 0.05 wt. % to about 5 wt. % zirconium, and about 0.1 wt. % to about 2 wt. % combined chlorine on a gamma-alumina, each amount being based upon the weight of the second reforming catalyst.

Not shown in the FIGURE is a fifth reactor, which reactor contains a mixture of layers of the two catalysts. This additional reactor is employed as a swing reactor for each of the four reactors in this system when the catalyst in a particular reactor has become deactivated and must be regenerated. The reactor containing this deactivated catalyst is removed from the system and is replaced by the swing reactor in order that the reforming system may be operated continuously, even though the deactivated catalyst has been removed from the system and is being regenerated.

The hydrogen-to-hydrocarbon ratio and the WHSV employed in the various reactors fall within the respective ranges of values as expressed hereinabove.

The effluent from reactor 29 passes through line 30, water cooler 31, and line 32 into gas-liquid separator 33. Gas-liquid separator 33 is operated at a pressure of about 80 psig to about 240 psig and at temperatures of about 100°F. Liquid product is removed from separator 33 through line 34 to be sent to a suitable product recovery system from which a high-octane-number product is obtained. Gaseous material is removed from separator 33 through line 35. A portion of this gas is removed from the system through line 36 to be used at other refinery units. The remainder of the hydrogen-hydrocarbon gas in line 35 is compressed by compressor 37 to be sent through line 38 and 14 as hydrogen-hydrocarbon recycle gas. When necessary, make-up hydrogen gas may be introduced into the system from source 39 via line 40.

A second embodiment of the process of the present invention may be represented also by the simplified schematic flow diagram dipicted in the accompanying FIGURE. In this second embodiment, each of the four reactors, including reactor 29, contains the catalytic composition of the present invention. Even the swing reactor (not shown) employs this catalyst, which comprises about 0.05 wt. % to about 2 wt. % platinum, about 0.05 wt. % to about 5 wt. % zirconium, and about 0.1 wt. % to about 2 wt. % combined chlorine on a gamma-alumina, each amount being based upon the weight of the catalyst. The operating conditions employed in this embodiment fall within the ranges of values set forth hereinabove. In this latter embodiment, either a virgin naphtha or a mildly-reformed or partially-reformed hydrocarbon stream may be employed as the hydrocarbon feedstock.

The above-described embodiments and the following examples are presented herein to facilitate the understanding of the present invention. These are presented for the purpose of illustration only and are not intended to limit the scope of the present invention.

EXAMPLE I

Several reforming catalysts that had been prepared commercially by the American Cyanamid Company and/or in the laboratory were selected for comparative reforming tests, which tests are discussed hereinafter in Example II. These catalysts will be identified as Catalysts A, B, C, D, E, and F.

Catalyst A was manufactured by the American Cyanamid Company. It contained 0.74 wt. % platinum and 0.75 wt. % combined chlorine on a gamma-alumina support.

Catalyst B was manufactured by the American Cyanamid Company and was subsequently modified in combined-chlorine content by treatment with an aqueous hydrochloric acid solution followed by drying in air at a temperature of 250°F. for 3 hours and subsequent calcining in air at a temperature of 1,000°F. for 3 hours. The air flow rate during the drying and calcining operations was about 2 cubic feet per hour. Catalyst B contained 0.74 wt. % platinum and 0.78 wt. % combined chlorine on gamma-alumina.

Catalyst C was manufactured by the American Cyanamid Company and was treated with an aqueous hydrochloric acid solution for adjustment of its combined-chlorine level. This procedure was similar to that outlined hereinabove for Catalyst B. Catalyst C contained 0.56 wt. % platinum, 0.51 wt. % rhenium, and 0.81 wt. % combined chlorine on a gamma-alumina support.

Catalyst D was prepared by impregnating a 100-gram portion of Catalyst B with zirconium by employing a solution prepared by dissolving 1.77 grams of zirconyl chloride, $ZrOCl_2$, in 150 ml. of distilled water. The catalyst was contacted with excess water 3 times to strip off chlorine from the material and was dried in air overnight at 250°F. and calcined in air as described for Catalyst B. Catalyst D was prepared to contain 0.5 wt. % zirconium and contained 0.74 wt. % platinum and 0.85 wt. % combined chlorine.

Catalyst E was manufactured by the American Cyanamid Company and was treated with an aqueous hydrochloric acid solution for adjustment of its combined-chlorine level. The treated catalyst was then dried and calcined in air as described for Catalyst B. Catalyst E contained 0.56 weight % platinum, 0.51 weight % rhenium, and 0.95 weight % combined chlorine.

Catalyst F was prepared by impregnating a 50-gram portion of Catalyst B with zirconium by employing a solution prepared by dissolving 0.88 gram of zirconyl chloride in 50 ml. of distilled water. The catalyst was subsequently treated to strip off chlorine, dried, and calcined as described for Catalyst D. Catalyst F was prepared to contain 0.5 weight percent zirconium and contained 0.74 weight % platinum and 0.90 weight % combined chlorine.

EXAMPLE II

Catalysts A, B, E, and F were tested individually for their ability to reform a full boiling range naphtha. The various properties of this feedstock are presented hereinbelow in Table I. This full boiling range naphtha is identified hereinafter as Feedstock No. 1.

TABLE I

| FEEDSTOCK PROPERTIES | | |
|---|---|---|
| Feedstock No. | 1 | 2 |
| Gravity, °API | 54.7 | 48.9 |
| Specific Gravity | 0.7612 | 0.7844 |
| Unleaded Research Octane No. | 50.4 | 87.4 |
| ASTM Distillation, °F. | | |
| IBP | 172 | 118 |
| 10 vol.%Rec. at | 222 | 188 |
| 30 | 246 | 230 |
| 50 | 276 | 256 |
| 70 | 310 | 284 |
| 90 | 350 | 324 |
| EBP | 394 | 398 |
| Composition, vol.% | | |
| Paraffins | 47.1 | 43.8 |
| Naphthenes | 41.0 | 3.0 |
| Aromatics | 11.9 | 53.2 |

The testing was carried out in a bench-scale test unit employing an isothermal fixed bed of catalyst. The hydrocarbon feedstock and bottled hydrogen (once-through) were mixed and the resulting hydrogen-hydrocarbon mixture was charged to a reactor having an inside diameter of 0.622 inch. The reactor, which was 20 inches long, was immersed in a heating bath per weight unit of catalyst, a kinetic average temperature of 883°F. to 892°F., and a hydrogen addition rate of about 5,000 SCFB. In each case, 20 grams of catalyst were employed. When the unit was placed on test, no sampling was performed for the first 5 hours to permit the test to line out. The results of these tests are presented hereinbelow in Table II.

TABLE II

REFORMING FEEDSTOCK NO. 1 AT 300 PSIG

| Catalyst | Test | Time on oil, hrs. | Temp., °F. | Hydrogen, SCFB | $C_5$+Yield, wt.% | $C_5$+O.N.** | Relative Activity |
|---|---|---|---|---|---|---|---|
| A | 1 | 9.5 | 892 | 5,510 | 87.8*** | 96.2 | 248 |
|   |   | 20 | 892 | 5,150 | 88.3*** | 95.4 | 224 |
|   |   | 59 | 889 | 5,030 | 89.2*** | 93.8 | 200 |
|   |   | 83 | 891 | 5,410 | 89.5*** | 93.2 | 176 |
|   |   | 98 | 890 | 5,130 | 90.0*** | 92.9 | 172 |
| B | 2 | 20 | 883 | 5,060 | 89.4 | 94.0 | 262 |
|   |   | 44 | 886 | 4,930 | 91.0 | 93.5 | 239 |
| E* | 3 | 23 | 888 | 5,550 | 87.0 | 96.8 | 301 |
|   |   | 47 | 889 | 5,060 | 87.8 | 96.7 | 286 |
|   |   | 94 | 889 | 4,980 | 88.8 | 95.6 | 242 |
| F | 4 | 22 | 885 | 5,490 | 88.2 | 96.4 | 347 |
|   |   | 46 | 887 | 5,190 | 89.2 | 95.2 | 289 |
| F* | 5 | 23 | 885 | 5,250 | 91.6 | 95.2 | 279 |
|   |   | 47 | 888 | 5,110 | 90.6 | 96.3 | 326 |
|   |   | 71 | 888 | 3,830 | 88.9 | 94.9 | 284 |
|   |   | 95 | 889 | 4,770 | 88.8 | 94.3 | 276 |

*CATALYST WAS PRESULFIDED
**$C_5$+RESEARCH OCTANE NUMBER
***ESTIMATED containing DuPont HITEC. The hydrocarbon feed was pumped by a positive-displacement Ruska pump. The effluent from the reactor was sent to conventional product handling and recovery equipment. Liquid samples were collected for octane analysis. Material balances were obtained from samples collected for 1 hour with a dry ice knock-back and such samples were analyzed by gas-chromatographic techniques.

Each catalyst sample that was charged to the reactor was in the form of 20-40-mesh material (U.S. Sieve Series). After the reactor was placed in the test unit, the catalyst was pretreated by being subjected to an air soak for one-half hour at an air rate of about 2 cubic feet per hour, a temperature of about 900°F., and a pressure of 300 psig. Subsequently, the catalyst was purged with nitrogen and then reduced with hydrogen for one hour at the test temperature and pressure. For the catalyst containing rhenium, Catalyst E, and the catalyst containing zirconium, Catalyst F, a pre-sulfiding technique was also employed. These catalysts were pre-sulfided with a gas mixture of 8 volume percent hydrogen sulfide in hydrogen at test temperature and pressure before they were tested.

These tests were conducted at a pressure of 300 psig, a WHSV of 2.28 weight units of hydrocarbon per hour The results of these tests, as presented in Table II, demonstrate that the catalyst of the present invention, Catalyst F, is superior to catalysts containing platinum and combined halogen on an alumina support, Catalysts A and B, and is at least as good as a catalyst containing platinum, rhenium, and combined halogen on an alumina support, Catalyst E, when used to reform a full boiling range naphtha under the conditions specified.

EXAMPLE III

Catalysts A, C, and D were tested individually for their ability to reform a partially-reformed naphtha, identified hereinafter as Feedstock No. 2. The properties of Feedstock No. 2 are presented in Table I.

These tests were conducted in a bench-scale test unit as described in Example II. However, the test conditions comprised a pressure of 200 psig, a WHSV of 3.62 weight units of hydrocarbon per hour per weight unit of catalyst, a kinetic average temperature of 894°F. to 910°F., and a hydrogen addition rate of about 2,710 SCFB to about 3,450 SCFB. In each case, 13 grams of catalyst were employed. The results of these tests are presented hereinbelow in Table III.

TABLE III

REFORMING FEEDSTOCK NO. 2 AT 200 PSIG

| Catalyst | Test | Time on Oil, hrs. | Temp., °F. | Hydrogen, SCFB | $C_5$+Yield wt.% | $C_5$+O.N.* | Relative Activity |
|---|---|---|---|---|---|---|---|
| A | 6 | 12 | 909 | 3,100 | 92.9** | 97.7 | 158 |
|   |   | 37 | 908 | 3,140 | 94.5** | 96.1 | 111 |
|   |   | 61 | 910 | 3,170 | 94.9** | 95.4 | 90 |
| C*** | 7 | 21 | 899 | 3,080 | 93.5 | 97.2 | 170 |
|   |   | 45 | 899 | 3,260 | 94.1 | 96.6 | 157 |
|   |   | 93 | 900 | 3,070 | 94.7 | 96.1 | 135 |
| D*** | 8 | 22 | 897 | 3,070 | 94.6 | 96.9 | 175 |
|   |   | 46 | 899 | 3,050 | 94.2 | 96.0 | 132 |
|   |   | 70 | 899 | 3,150 | 95.1 | 95.9 | 128 |
|   |   | 95 | 899 | 3,120 | 95.2 | 95.4 | 115 |
| D*** | 9 | 21 | 894 | 2,750 | 94.0 | 98.0 | 232 |
|   |   | 44 | 895 | 2,850 | 96.5 | 96.5 | 161 |

TABLE III-continued

| | | REFORMING FEEDSTOCK NO. 2 AT 200 PSIG | | | | | |
|---|---|---|---|---|---|---|---|
| Catalyst | Test | Time on Oil, hrs. | Temp., °F. | Hydrogen, SCFB | C₅+Yield wt.% | C₅+O.N.* | Relative Activity |
| | | 139 | 901 | 2,710 | 96.0 | 95.2 | 97 |

*C₅+RESEARCH OCTANE NUMBER
**ESTIMATED
***CATALYST WAS PRESULFIDED

These tests wherein a partially-reformed naphtha was reformed were conducted to simulate a reaction system having the catalyst of the present invention only in the tail reactor or tail-reactor section of the system. The results of these tests indicate that an embodiment of the process of the present invention employing the catalyst of the present invention only in the tail reactor(s) is a superior reforming process.

What is claimed is:

1. A process for reforming a petroleum hydrocarbon stream, which process comprises contacting said hydrocarbon stream in a first reforming zone under reforming conditions and in the presence of hydrogen with a first reforming catalyst that does not contain zirconium to produce a first reformate and subsequently contacting said first reformate in a second reforming zone under reforming conditions and in the presence of hydrogen with a second reforming catalyst comprising a Group-VIII-noble-metal hydrogenation component and a small amount of zirconium on a solid catalytic support comprising a porous refractory inorganic oxide, said Group-VIII-noble-metal hydrogenation component being present in an amount of about 0.05 wt. % to about 2 wt. % and said zirconium being present in an amount of about 0.05 wt. % to about 5 wt. %, each being calculated as the element and based upon the total weight of said second reforming catalyst.

2. The process of claim 1 wherein said Group-VIII-noble-metal hydrogenation component of said second reforming catalyst is platinum and said porous refractory inorganic oxide of said second reforming catalyst is a catalytically active alumina.

3. The process of claim 1 wherein the reforming conditions for both the first reforming zone and the second reforming zone comprise an average catalyst temperature of about 700°F. to about 1,050°F., a pressure of about 50 psig to about 1,000 psig, a WHSV of about 0.5 to about 10 weight units of hydrocarbon per hour per weight unit of catalyst, and a hydrogen addition rate of about 1,500 SCFB to about 15,000 SCFB.

4. The process of claim 2 wherein said second reforming catalyst also contains a combined halogen, preferably chlorine, and said halogen is present in an amount of about 0.1 wt. % to about 2 wt. %, based upon the total weight of said second reforming catalyst.

5. The process of claim 2 wherein the reforming conditions for both the first reforming zone and the second reforming zone comprise an average catalyst temperature of about 700°F. to about 1,050°F., a pressure of about 50 psig to about 1,000 psig, a WHSV of about 0.5 to about 10 weight units of hydrocarbon per hour per weight unit of catalyst, and a hydrogen addition rate of about 1,500 SCFB to about 15,000 SCFB.

6. The process of claim 4 wherein the reforming conditions for both the first reforming zone and the second reforming zone comprise an average catalyst temperature of about 700°F. to about 1,050°F., a pressure of about 50 psig to about 1,000 psig, a WHSV of about 0.5 to about 10 weight units of hydrocarbon per hour per weight unit of catalyst, and a hydrogen addition rate of 1,500 SCFB to about 15,000 SCFB.

* * * * *

UNITED STATES PATENT OFFICE
CERTIFICATE OF CORRECTION

PATENT NO. : 3,943,050

DATED : March 9, 1976

INVENTOR(S) : Ralph J. Bertolacini and Dae K. Kim

It is certified that error appears in the above-identified patent and that said Letters Patent are hereby corrected as shown below:

Column 1, Title page, "Assignee: Standard Oil Company, Chicago, Illinois" should be added.

" 6, line 57, "average temperature" should be -- average catalyst temperature --.

" 12, Table II, under the heading "Hydrogen, SCFB", "3,830" should be -- 4,830 --.

Signed and Sealed this

Tenth Day of August 1976

[SEAL]

Attest:

RUTH C. MASON
Attesting Officer

C. MARSHALL DANN
Commissioner of Patents and Trademarks